(12) United States Patent
Wood

(10) Patent No.: US 11,613,480 B2
(45) Date of Patent: Mar. 28, 2023

(54) ELECTROLYTIC CELL WITH BIPOLAR ELECTRODES FOR WASTEWATER TREATMENT

(71) Applicant: AXINE WATER TECHNOLOGIES INC., Vancouver (CA)

(72) Inventor: Brendan Wood, Vancouver (CA)

(73) Assignee: AXINE WATER TECHNOLOGIES INC., Vancouver (CA)

( * ) Notice: Subject to any disclaimer, the term of this patent is extended or adjusted under 35 U.S.C. 154(b) by 40 days.

(21) Appl. No.: 16/982,002

(22) PCT Filed: Mar. 20, 2019

(86) PCT No.: PCT/US2019/023229
§ 371 (c)(1),
(2) Date: Sep. 17, 2020

(87) PCT Pub. No.: WO2019/183260
PCT Pub. Date: Sep. 26, 2019

(65) Prior Publication Data
US 2021/0130199 A1    May 6, 2021

Related U.S. Application Data

(60) Provisional application No. 62/646,168, filed on Mar. 21, 2018.

(51) Int. Cl.
*C25B 9/17*    (2021.01)
*C25B 1/04*    (2021.01)
(Continued)

(52) U.S. Cl.
CPC ........ *C02F 1/46109* (2013.01); *C02F 1/4672* (2013.01); *C02F 2001/46128* (2013.01);
(Continued)

(58) Field of Classification Search
CPC .... C02F 2201/4611; C02F 2001/46152; C02F 1/46109; C02F 2303/04;
(Continued)

(56) References Cited

U.S. PATENT DOCUMENTS

| | | |
|---|---|---|
| 3,759,815 A | 9/1973 | Larsson |
| 3,819,503 A | 6/1974 | Casson et al. |

(Continued)

FOREIGN PATENT DOCUMENTS

| | | |
|---|---|---|
| CA | 2971084 A1 | 5/2016 |
| CN | 106795013 A | 5/2017 |

(Continued)

*Primary Examiner* — Zulmariam Mendez
(74) *Attorney, Agent, or Firm* — Seed IP Law Group LLP

(57) ABSTRACT

An electrolytic cell for treating wastewater comprises an anode assembly, a cathode assembly and at least one bipolar electrode assembly placed between the anode and the cathode assembly such that the anodes of the anode assembly and the cathodes of the cathode assembly are interleaved with the bipolar plates of the bipolar electrode assembly. Each bipolar electrode assembly comprises a series of bipolar electrodes which operate as an anode or as a cathode, stacked in a vertical direction along a threaded bolt made of an electrically conductive material such that the bipolar electrodes operating as anodes are oriented in an opposite direction to the bipolar electrodes operating as cathodes and have their ends overlapping over a predetermined portion and being separated by conductive spacers. In preferred embodiments, only the anodes and the bipolar electrodes operating as anodes are coated with catalyst which saves costs and simplifies the manufacturing process.

15 Claims, 7 Drawing Sheets

(51) Int. Cl.
*C02F 1/461* (2023.01)
*C02F 1/467* (2023.01)

(52) U.S. Cl.
CPC .............. *C02F 2001/46142* (2013.01); *C02F 2001/46152* (2013.01); *C02F 2201/4616* (2013.01)

(58) Field of Classification Search
CPC ...... C02F 2201/46145; C02F 2201/002; C02F 2209/29; C02F 1/461; C02F 2201/461; C25B 1/04; C25B 9/00; C25B 1/26; C25B 11/00; C25B 9/17
See application file for complete search history.

(56) References Cited

U.S. PATENT DOCUMENTS

| | | |
|---|---|---|
| 3,926,771 A | 12/1975 | Lieb et al. |
| 2015/0053552 A1 | 2/2015 | Fraim et al. |
| 2016/0101996 A1 | 4/2016 | Casbeer et al. |

FOREIGN PATENT DOCUMENTS

| | | |
|---|---|---|
| CN | 107108284 A | 8/2017 |
| JP | H06192869 A | 7/1994 |
| WO | 2016199269 A1 | 12/2016 |

ELECTROLYTIC CELL WITH BIPOLAR ELECTRODES FOR WASTEWATER TREATMENT

TECHNICAL FIELD

The present invention relates to an electrolytic cell for treating wastewater which comprises a plurality of bipolar electrode assemblies.

BACKGROUND

Wastewater treatment systems are high in demand due to tighter wastewater disposal regulations whereby industrial facilities are required to eliminate their recalcitrant water pollutants prior to discharge and due to the current global shortage of clean water. Therefore, there is an increasing demand of cost-effective, sustainable wastewater treatment systems that do not require addition of chemicals, do not produce secondary pollution, and have minimal operational and maintenance requirements.

The preferred approach to treat recalcitrant wastewater is by electrochemical oxidation, which is a sustainable, safe and highly efficient treatment solution for eliminating a wide variety of pollutants such as persistent organic pollutants, dioxins, nitrogen species (e.g. ammonia), pharmaceuticals, pathogens, microorganisms and others. One approach for treating wastewater is by direct electrochemical oxidation of organic and/or inorganic pollutants whereby such pollutants are oxidized directly on the anode surface. Another method is the indirect electrochemical oxidation of organic and/or inorganic pollutants through the in-situ generation of chemically oxidizing species (such as hydroxyl, chlorine, oxygen or perchlorate radicals or compounds such as hypochlorite, ozone, or hydrogen peroxide). These chemically oxidizing species are generated directly on the anode surface and subsequently oxidize the pollutants within the wastewater solution.

In systems employing electrochemical oxidation for treating wastewater, the anode catalyst can be selected from the group comprising platinum, tin oxide, antimony tin oxide, ruthenium oxide, iridium oxide, niobium doped antimony tin oxide, graphite, manganese oxide, or it can be a more expensive, but highly efficient catalyst such as diamond or boron-doped diamond. The anode catalyst can also be niobium doped antimony tin oxide further comprising a dopant selected from the group comprising iron, fluorine, platinum and nickel, or tin oxide doped with molybdenum, chromium, bismuth, tungsten, cobalt, nickel, palladium, niobium, tantalum, platinum, palladium, vanadium, rhenium and mixtures of such dopants, or antimony tin oxide dispersed on niobium, palladium, carbides, nitrides, borides, corrosion resistant metals, alloys, and metal oxides, such as niobium, niobium pentoxide, zinc oxide, or niobium carbide. The cathode catalyst can be platinum, manganese oxide, graphite, carbon, palladium, rhodium, nickel and oxides thereof, but the cathode is preferably an uncoated substrate made of nickel, stainless steel, titanium, nickel-cobalt-lanthanum oxide (NiCoLaOx) etc. This represents a more economical alternative than having both the anode and cathode coated with an expensive catalyst, when such a catalyst is not required on the cathode for the wastewater treatment.

Bipolar electrodes have been used in electrolytic cells for the production of oxyhalogen solutions, or for other electrolytic processes. Bipolar cells are run at higher voltage and lower current than the monopolar cells (having the same reactive area and operating at the same current density) and this helps reduce the cost of power supplies and the size of the conductors for supplying electrical energy to the cell.

An example of an bipolar electrolytic cell used for the production of oxyhalogens is disclosed for example in U.S. Pat. No. 3,819,503 which describes an electrolytic cell comprising a plurality of dimensionally stable anodes positioned in a spaced relationship in a terminal compartment, a plurality of cathodes positioned in a spaced relationship in another terminal compartment and a plurality of bipolar electrode assemblies extending between the two terminal compartments such that some bipolar cathode portions extend in the spaces between the dimensionally stable anodes in one terminal compartment and some bipolar anode portions extend in the space between the cathodes in the other terminal compartment, and the bipolar anode portions of a bipolar electrode assembly placed between the end compartments are interleaved with the bipolar cathode portions of the bipolar electrode assembly next to it. In this electrolytic cell the bipolar plates of each bipolar plate assembly have half portion operating as an anode and the other half portion operating as a cathode and are arranged in a closely spaced face-to-face relationship between insulating partitions. Consequently the electrodes are spaced as close as practically possible to each other and maintained free from electrical contact by electrically non-conductive separators interwoven through, or positioned within, the openings of the electrodes. In this patent, each of the bipolar electrodes is a plate whose half portion serves as an anode and the other half serves as a cathode. Such a bipolar arrangement has the disadvantage that the catalyst would need to be coated on the entire surface of the electrode, even if only half of it functions as an anode and requires a catalyst layer coating, because leaving half of the bipolar electrode uncoated with catalyst could lead to the delamination of the catalyst layer on the portion of the electrode which operates as an anode and its premature failure. This results in poor catalyst utilization, and in the case of more expensive catalysts, for example diamond, such a solution can be very expensive.

In another example described in U.S. Pat. No. 3,759,815, a bipolar electrode assembly used in a cell for the electrolysis of sodium chloride comprises a two-side base plate with a number of anode plates extending from the titanium side of the base plate and a number of cathode plates extending from the iron side of the base plate, the anode and the cathode plates being formed from the same material as their corresponding base plate. Alternatively, the bipolar electrode assembly is composed of electrode units, each electrode unit comprising, for example, a titanium anode and an iron cathode, joined together with a double flange (as illustrated in FIG. 5 of this patent), and the electrode units are pressed into electrical connection by some side members connected to the side walls of the cell box. The outer extremities of the anodes and cathodes are secured at a distance between each other by spacers made of an insulating material. Such bipolar electrode assemblies, comprising the two-side base plates or the double flanges are difficult to manufacture.

Therefore, there is a need to further improve the design of the electrolytic cells with bipolar electrodes for wastewater treatment, for achieving a simple, easy to assemble electrolytic cell comprising easy to manufacture elements, having a reduced overall cost by employing catalysts such as diamond or platinum only on the bipolar electrodes which operate as anodes and connecting such bipolar electrodes in a simple way to achieve an efficient operation of the electrolytic cell at a lower current.

SUMMARY OF THE INVENTION

The present invention describes an electrolytic cell for wastewater treatment comprising:
a. an anode assembly comprising a plurality of anodes stacked in a spaced face-to-face relationship along a threaded bolt made of an electrically conductive material with their ends overlapping over a predetermined portion and being separated by spacers made of an electrically conductive material which keep the anodes at a predetermined distance B from each other;
b. a cathode assembly comprising a plurality of cathodes stacked in a spaced face-to-face relationship along a threaded bolt made of an electrically conductive material with their ends overlapping over a predetermined portion and being separated by spacers made of an electrically conductive material which keep the cathodes at a predetermined distance A from each other;
c. at least one bipolar electrode assembly comprising a series of bipolar electrodes operating as anodes and a series of bipolar electrodes operating as cathodes alternately stacked along a threaded bolt made of an electrically conductive material with their ends overlapping over a predetermined portion and being separated by spacers made of an electrically conductive material which keep the bipolar electrodes operating as anodes at a predetermined distance C from each other and which keep the bipolar electrodes operating as cathodes at a predetermined distance D from each other, wherein in each bipolar electrode assembly the bipolar electrodes which operate as anodes are oriented in an opposite direction from the bipolar electrodes which operate as cathodes, such that the bipolar electrodes which operate as anodes are interleaved with the bipolar electrodes of a neighbouring bipolar electrode assembly which operate as cathodes or with the cathodes of the cathode assembly and the bipolar electrodes which operate as cathodes are interleaved with the anodes of the anode assembly or with the bipolar electrodes of a neighbouring bipolar electrode assembly which operate as anodes.

In preferred embodiments the distance B between the anodes is equal with the distance A between the cathodes and further it can be equal to the distance C between the bipolar electrodes operating as anodes and with the distance D between the bipolar electrodes operating as cathodes.

The anodes of the anode assembly, the cathodes of the cathode assembly and the bipolar electrodes of a bipolar electrode assembly can be in the shape of a solid plate, a porous plate, a plate with orifices or a mesh.

In preferred embodiments, the anodes of the anode assembly and the bipolar electrodes operating as anodes are the only electrodes coated with catalyst. In other embodiments, the cathodes of the cathode assembly and the bipolar electrodes operating as cathodes can also be coated with catalyst.

The anodes of the anode assembly, the cathodes of the cathode assembly and the bipolar electrodes of the bipolar electrode assembly can have a rectangular shape and are provided with at least one orifice for allowing the passage of the threaded bolt.

In some embodiments, the anodes of the anode assembly, the cathodes of the cathode assembly and the bipolar electrodes of the bipolar electrode assembly have a polygonal shape comprising a rectangular active area and a polygonal extension of the rectangular active area, which forms the assembly area and is provided with an orifice for allowing the passage of the threaded bolt. In preferred embodiments, the entire surface of the anodes and of the bipolar electrodes operating as anodes having a polygonal shape (including the rectangular active area and the assembly area) is coated with catalyst to prevent catalyst delamination.

The anode electrode assembly is connected through the threaded bolt to a conductive plate which is connected to the positive side of a power supply, and the cathode electrode assembly is connected through a threaded bolt to another conductive plate which is connected to the negative side of the power supply.

The free ends of the anodes of the anode assembly, of the cathodes of the cathode assembly and of the bipolar electrodes of the bipolar electrode assembly are kept at a predetermined distance from the anodes, cathode or bipolar electrodes that they are interleaved with, by spacers of an electrically non-conductive material placed between the electrodes, and by a threaded bolt and nut assembly made of an electrically non-conductive material, the threaded bolt protruding through holes provided in the spacers and in the free ends of the anodes, cathodes and bipolar electrodes.

The anodes of the anode assembly or the bipolar electrodes of the bipolar electrode assembly which operate as anodes are interleaved with the cathodes of the cathode assembly or with the bipolar electrodes of the bipolar electrode assembly which operate as cathodes such that both sides of each anode or of each bipolar electrode operating as an anode are facing a cathode or a bipolar electrode operating as a cathode. This can be achieved by having the number of cathodes in the cathode assembly or of the bipolar electrodes operating as cathodes greater by one than the number of anodes or than the number of bipolar electrodes operating as anodes.

In preferred embodiments the conductive spacers placed between bipolar electrodes of the bipolar electrode assembly are smaller in size (e.g. surface area, thickness) than the conductive spacers placed between the anodes of the anode assembly or than the conductive spacers placed between the cathodes of the cathode assembly.

The present invention further discloses a reactor comprising a tubular casing connected with an end plate assembly at each end, each end plate assembly comprising two cover plates and an electrically conductive plate interposed between the two cover plates, the electrically conductive plate of the first end plate assembly being connected to the anode assembly and to the positive side of a power supply and the electrically conductive plate of the second end plate assembly being connected to the cathode assembly and to the negative side of the power supply. The reactor encloses the electrolytic cell described in the present invention.

The cover plates of each end plate assembly comprise an opening for feeding wastewater to be treated to the electrolytic cell enclosed in the reactor. The reactor can further comprise a baffle which is made of an electrically non-conductive material and which is placed within the tubular casing of the reactor in the proximity of the threaded bolt and nut assembly which secures the positioning of the bipolar electrodes of the bipolar electrode assembly, the baffle being provided with openings through which the bipolar electrodes penetrate and which allow the flow of the wastewater which circulates through the reactor. The baffle is sized to match the interior dimensions of the reactor casing with appropriate tolerances for securing the positioning of the electrodes within the reactor.

In some embodiments, the reactor further comprises a spacing plate on each side of at least one of the anode assembly, the cathode assembly and at least one of the bipolar electrode assemblies, the spacing plates being placed between the respective assembly and the interior wall of the reactor, and being provided with channels in which the ends of the anodes, of the cathodes or respectively of the bipolar electrodes of the respective assembly are fitted to maintain a constant distance between them.

BRIEF DESCRIPTION OF THE DRAWINGS

The drawings illustrate specific preferred embodiments of the invention, but should not be considered as restricting the spirit or scope of the invention in any way.

DETAILED DESCRIPTION

Certain terminology is used in the present description and is intended to be interpreted according to the definitions provided below. In addition, terms such as "a" and "comprises" are to be taken as open-ended. Further, all US patent publications and other references cited herein are intended to be incorporated by reference in their entirety.

Figure 1:
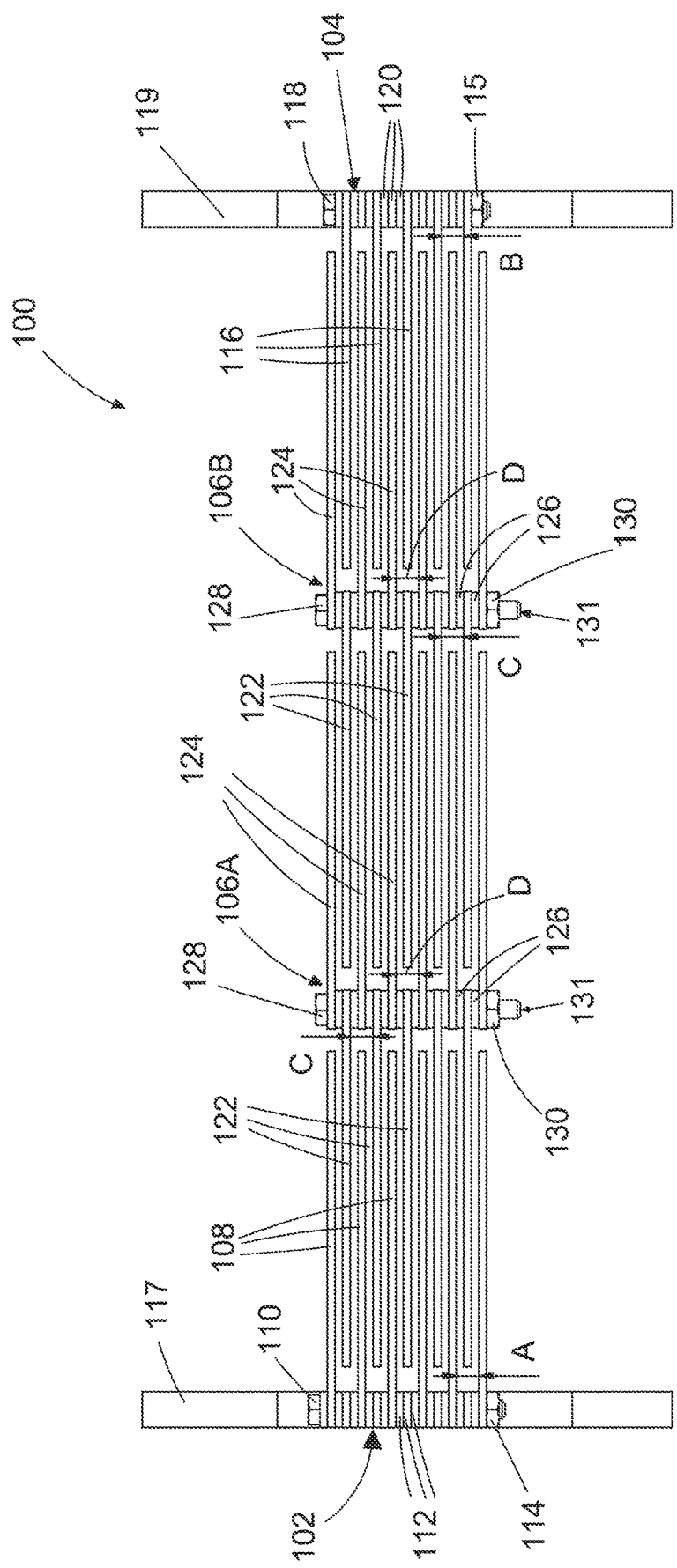
FIG. 1 illustrates a cross-sectional view of an electrolytic cell for wastewater treatment according to the present invention.

An exemplary electrolytic cell according to the present invention is illustrated in FIG. 1.

The electrolytic cell 100 comprises a cathode assembly 102, an anode assembly 104 and several bipolar electrode assemblies 106A, 106B positioned between the anode assembly and the cathode assembly.

Cathode assembly 102 comprises several cathodes 108 which are stacked along a threaded bolt 110 in a face to face relationship. Spacers 112, made of an electrically conductive material, are inserted between cathodes 108 along the threaded bolt 110 to maintain a distance "A" between the cathodes such that, in the assembled electrolytic cell, some bipolar electrodes can be interleaved with the cathodes as illustrated in FIG. 1 and further described below. The assembly formed by the cathodes 108 and spacers 112 is kept assembled together by the threaded bolt 110 and nut 114 and is kept connected through the threaded bolt to a conductive plate 117 which is connected to the negative side of a power supply. The threaded bolt 110 is also made of an electrically conductive material.

Similarly, anode assembly 104 comprises several anodes 116 which are stacked along a threaded bolt 118 in a face to face relationship and are connected to each other through the threaded bolt 118 and nut 115. Spacers 120 are inserted between anodes 116 along the threaded bolt 118 to maintain a distance "B" between the anodes 116 such that some bipolar electrodes can be interleaved with the anodes. The assembly formed by anodes 116 and spacers 120 is kept connected through the threaded bolt 118 to a conductive plate 119 which is connected to the positive side of a power supply. The spacers 120 and the threaded bolt 118 are made of an electrically conductive material. The cathodes 108 of the cathode assembly 102 and the anodes 116 of the anode assembly 104 are monopolar electrodes.

In the embodiment illustrated in FIG. 1 several spacers 112 and respectively 120 are placed between the neighbouring cathodes 108 and respectively between the neighbouring anodes 116 to maintain an appropriate distance between the respective electrodes as described above. In other embodiments only one spacer of a predetermined thickness which is equal to the distance A and respectively B can be placed between the respective neighbouring electrodes.

Bipolar electrode assemblies 106A, 106B comprise several bipolar electrodes 122 and several bipolar electrodes 124, separated by spacers 126 and connected by a threaded bolt 128. In each bipolar electrode assembly 106A, 106B, bipolar electrodes 122 and bipolar electrodes 124 are alternately stacked along the threaded bolt 128 and bipolar electrodes 122 are oriented in the opposite direction from bipolar electrodes 124 relative to the threaded bolt 128 which connects them. The assembly 131 formed by the nut 130 together with the threaded bolt 128 keeps the entire bipolar electrode assembly together and the spacers 126 ensure the required distance between the electrodes. Spacers 126 and threaded bolt 128 are made of an electrically conductive material.

The bipolar electrodes 122 of the bipolar electrode assembly 106A which is placed next to the cathode assembly 102, are interleaved between cathodes 108 and operate as anodes and the other bipolar electrodes 124 of the same assembly 106A operate as cathodes and are interleaved with the bipolar electrodes 122 of the bipolar electrode assembly 106B. Similarly, the bipolar electrodes 124 of the bipolar electrode assembly 106B, which is placed next to the anode assembly 104, are interleaved between anodes 116 and operate as cathodes, and the other bipolar electrodes 122 of the same assembly 106B operate as anodes.

In each bipolar electrode assembly 106A, 106B, the ends of bipolar electrodes 122 are positioned to overlap with the ends of the bipolar electrodes 124 and spacers 126 connect the overlapped ends of the bipolar electrodes. The spacers 126, placed between the electrodes of each bipolar electrode assembly along the threaded bolt 128, maintain a certain distance "C" between the bipolar electrodes 122 and respectively a distance "D" between the bipolar electrodes 124. Generally, for a more uniform current density distribution, the distance "C" between the bipolar electrodes 122 which operate as anodes is equal to the distance "B" between the anodes 116 and the distance "D" between the bipolar electrodes 124 which operate as cathodes is preferably equal to the distance "A" between the cathodes 108. Furthermore, the distance "A" between the cathodes is preferably equal to distance "B" between the anodes.

In preferred embodiments, the values of the distances "A", "B", "C" and "D" between the electrodes are calculated to minimize the electrical resistance between the electrodes and such that the velocity of the fluid (wastewater) flowing between them enhances the electrochemical reactions at the surface of the electrodes for removing the pollutants, and generates enough turbulence at the surface of the electrodes to accelerate such reactions. If the distances between the electrodes are smaller, good pollutant removal results can be obtained for wastewater having a lower electrical conductivity, which means that less electrolyte has to be added to help with the electrochemical reactions.

Spacers 112, 120 and 126 can be equal in size (e.g. surface area, thickness). In preferred embodiments the spacers placed between the bipolar electrodes are smaller than the spacers placed between the anodes of the anode assembly and also smaller than the spacers placed between the cathodes of the cathode assembly because the spacers in the bipolar plate assemblies transmit less current. The size of each type of spacer, more specifically the surface area of the spacer, is calculated based on the current that needs to be transmitted through the spacer and on the conductivity of its material. Making the spacers placed between the bipolar electrodes smaller than the spacers placed between the anodes or between the cathodes of the anode and respectively of the cathode assemblies, implicitly reduces the overlap area of the bipolar electrodes 122 which act as an anode and the bipolar electrodes 124 which act as a cathode. This allows more area of the bipolar electrodes 122 which is coated with catalyst to be used as an active area. By "active area" it is meant the area of the electrode coated with catalyst which comes in contact with the wastewater circulating through the electrolytic cell and generates the electrochemical oxidation reactions for treating the wastewater. Therefore, the surface area of the spacers 126 between the bipolar electrodes is calculated to be the minimum surface area required for a predetermined current value and a predetermined material conductivity.

In the present invention, anodes 116 and bipolar electrodes 122 which operate as anodes are plates coated by an anode catalyst. For example, the plates can be made of titanium, niobium, tantalum and the like and the anode catalyst is preferably boron doped diamond, but can also be diamond, platinum, iridium oxide, iridium-ruthenium oxide, iridium-tantalum oxide, iridium-titanium oxide, ruthenium oxide, tin/antimony oxide, gold, indium, palladium, carbon, graphite and the like. Cathodes 108 and bipolar electrodes 124 which operate as cathodes are preferably made of stainless steel, nickel, titanium, graphite, glassy carbon, boron doped diamond, nickel-cobalt-lanthanum oxide (Ni-CoLaOx), or steel and are preferably not coated with catalyst. In some embodiments, when the electrolytic cell is intended to be operated in reversed mode both the anodes and the cathodes and respectively all the bipolar electrodes 122 and 124 are coated with a catalyst that can sustain both the anode and cathode operation mode, for example iridium oxide, ruthenium oxide, iridium-tantalum oxide, iridium-ruthenium-tantalum oxide, etc. For all the monopolar or bipolar electrodes of this invention, meshes, perforated plates or porous plates can be used instead of solid plates for the electrode substrate.

Because the anodes are generally more expensive than the cathodes due to their catalyst, the bipolar electrode assemblies and the anode and cathode assemblies are designed such that all the surfaces of the anodes are fully utilized for treating the wastewater circulating in the vicinity of the electrolytic cell. The number of electrodes 108, 116, 122 and 124 is chosen such that the bipolar electrodes 122 which operate as anodes and respectively the anodes 116 of the anode assembly 104 are positioned in the space between two cathodes 108 from the cathode assembly or between two bipolar electrodes 124 of the neighbouring bipolar electrode assembly which operate as cathodes. Therefore, the number "n" of the bipolar electrodes of a bipolar electrode assembly which operate as a cathode and, respectively the number of the cathodes is greater by one than the number "m" of the bipolar electrodes which operate as anodes, and respectively the number of anodes (n=m+1).

FIG. 1 illustrates two bipolar electrode assemblies 106A, 106B arranged in series between the anode assembly 104 and the cathode assembly 102. A person skilled in the art would understand that the electrolytic cell can comprise only one bipolar electrode assembly or, in preferred embodiments, more than two bipolar electrode assemblies, between the anode assembly 104 and the cathode assembly 102.

Figure 2:
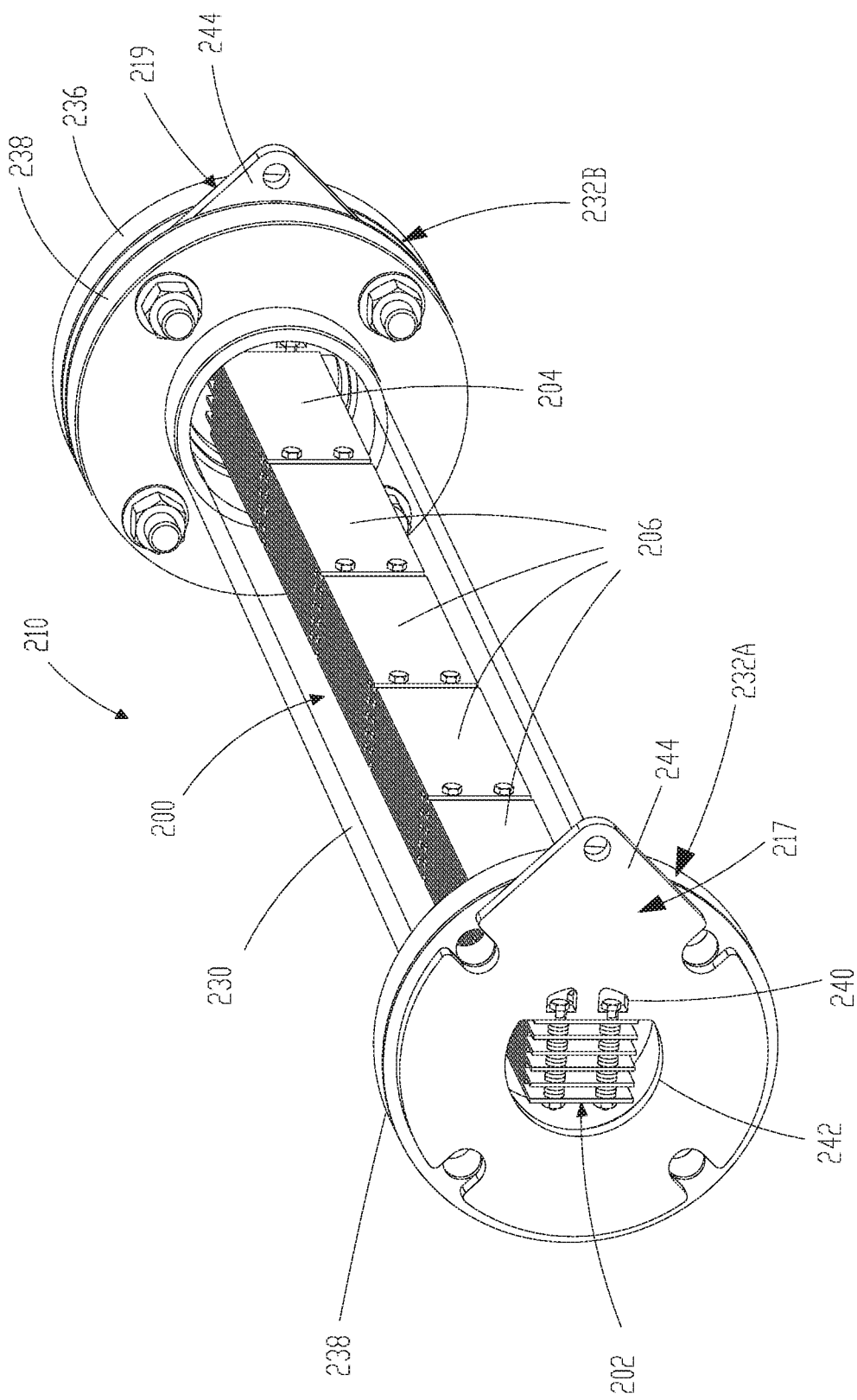
FIG. 2 shows a tri-dimensional view of an electrolytic cell of the present invention placed within a treatment reactor.

FIG. 2 illustrates an electrolytic cell 200 of the present invention placed in a flow-through reactor 210. The electrolytic cell comprises several bipolar electrode assemblies 206, placed between an anode assembly 204 and a cathode assembly 202. The flow through reactor illustrated in FIG. 2 has a tubular casing 230, which surrounds the electrolytic cell, and two end plate assemblies 232A and 232B. The tubular casing 230 of the flow-through reactor is illustrated as a see-through component for illustration purposes only. The first end plate assembly 232A comprises a conductive plate 217 which is connected to the negative side of a power supply, and the second end plate assembly 232B comprises a conductive plate 219 which is connected to the positive side of a power supply and each of the two end plate assemblies further comprises two cover plates 236, 238, one on each side of the conductive plate. In FIG. 2 one of the cover plates for the end plate assembly 232A comprising the conductive plate 217 has been removed for illustration purposes. Conductive plates 217, 219 have a similar construction, with each conductive plate having some holes 240 through which the threaded bolts of the anode or, respectively the cathode assembly, protrude and some openings 242 which can accommodate the anode and respectively the cathode assembly and also allow wastewater to enter and respectively exit the reactor. The threaded bolt and nut assemblies which hold together the electrodes of the cathode assembly 202 and respectively of the anode assembly 204 also hold the electrolytic cell in a fixed position relative to the end plate assemblies 232A and 232B within the reactor 210. Each of the conductive plates 217, 219 comprises a terminal portion 244 which connects the conductive plate and, respectively the electrolytic cell, to the power supply/electric charge (not illustrated).

Figure 3:
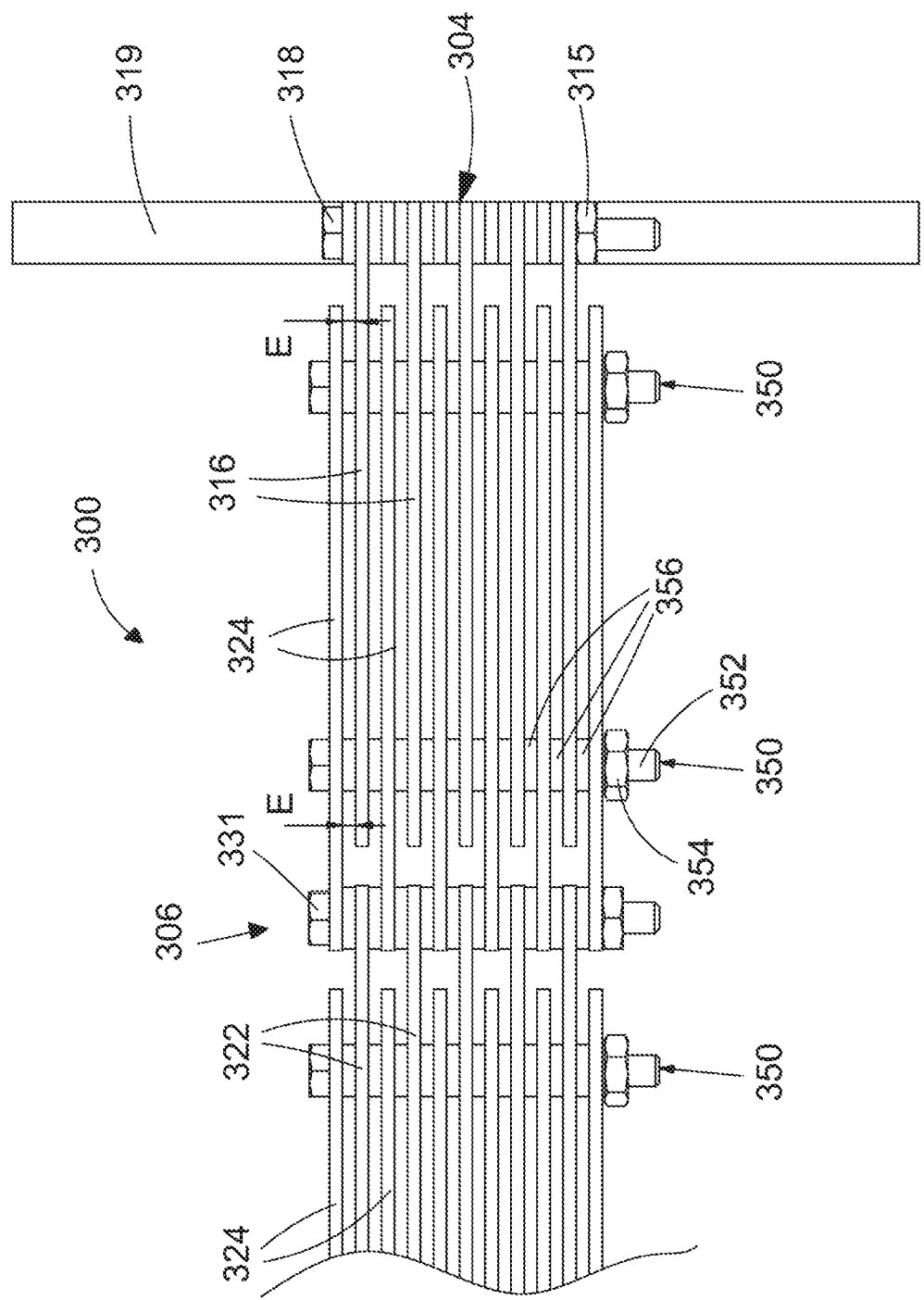
FIG. 3 illustrates a cross-sectional view of an embodiment of an electrolytic cell comprising threaded bolt/nut assemblies provided with spacers for maintaining the relative position of the bipolar and monopolar electrodes.

FIG. 3 illustrates a cross-sectional view of a portion of an electrolytic cell 300 according to another embodiment of the present invention. In this embodiment, the free ends of the anodes 316 of the anode assembly 304 are kept at a distance "E" from the bipolar electrodes 324 of the bipolar electrode assembly 306, by a threaded bolt/nut assembly 350 provided with spacers 356 which are interposed between the electrodes, the threaded bolt protruding through holes provided in the free ends of the anodes. Similarly, the free ends of the bipolar electrodes 324 of the bipolar plate assembly 306 are kept at a distance "E" from the anodes 316 of the anode assembly 304 by the spacers of another threaded bolt/nut assembly 350. Similar threaded bolt/nut assemblies 350 are placed near the free ends of the bipolar electrodes 324 of the neighbouring bipolar electrode assembly, as illustrated in FIG. 3, and near the free ends of the bipolar electrodes 322, and respectively near the free ends of the cathodes of the cathode assembly (not illustrated) to prevent any short-circuiting and to allow an even current density on the electrode surface.

Each threaded bolt nut assembly 350 comprises a threaded bolt 352, a nut 354 and non-conductive spacers 356 which are placed between the electrodes. The threaded bolt 352 and the nut 354 are also made of electrically non-conductive materials.

Similar to the embodiment illustrated in FIG. 1, electrolytic cell 300 also comprises threaded bolt/nut assemblies 331 which keep the bipolar electrodes of bipolar electrode assembly 306 together, and a threaded bolt 318 and a nut 315 which connect the anode assembly 304 with the conductive plate 319.

Figure 4:
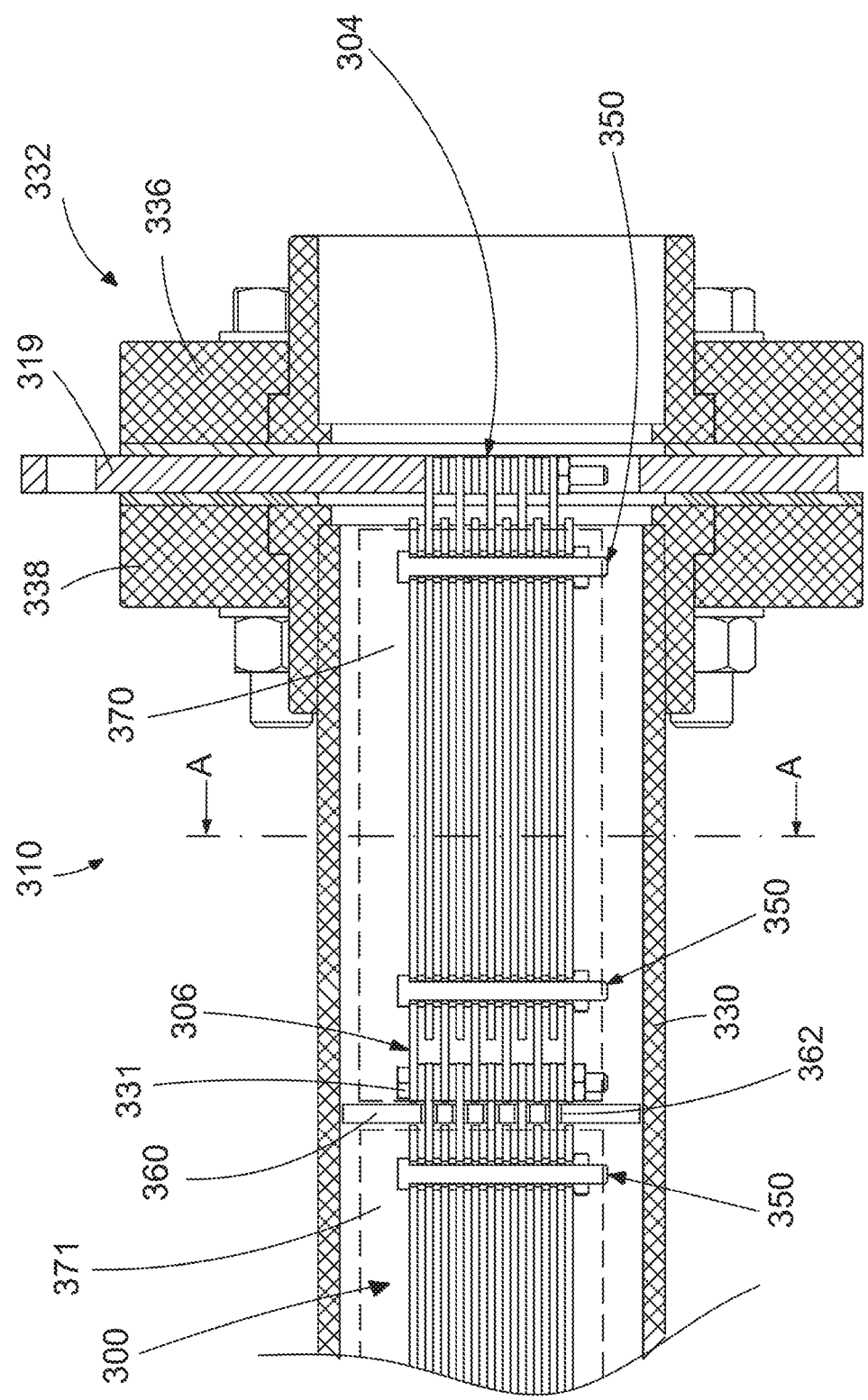
FIG. 4 illustrates a cross-sectional view of an electrolytic cell comprising threaded bolt/nut assemblies provided with spacers for maintaining the relative position of the free ends of the bipolar and monopolar electrodes and baffles for positioning the bipolar plate assemblies within a reactor.
Figure 5:
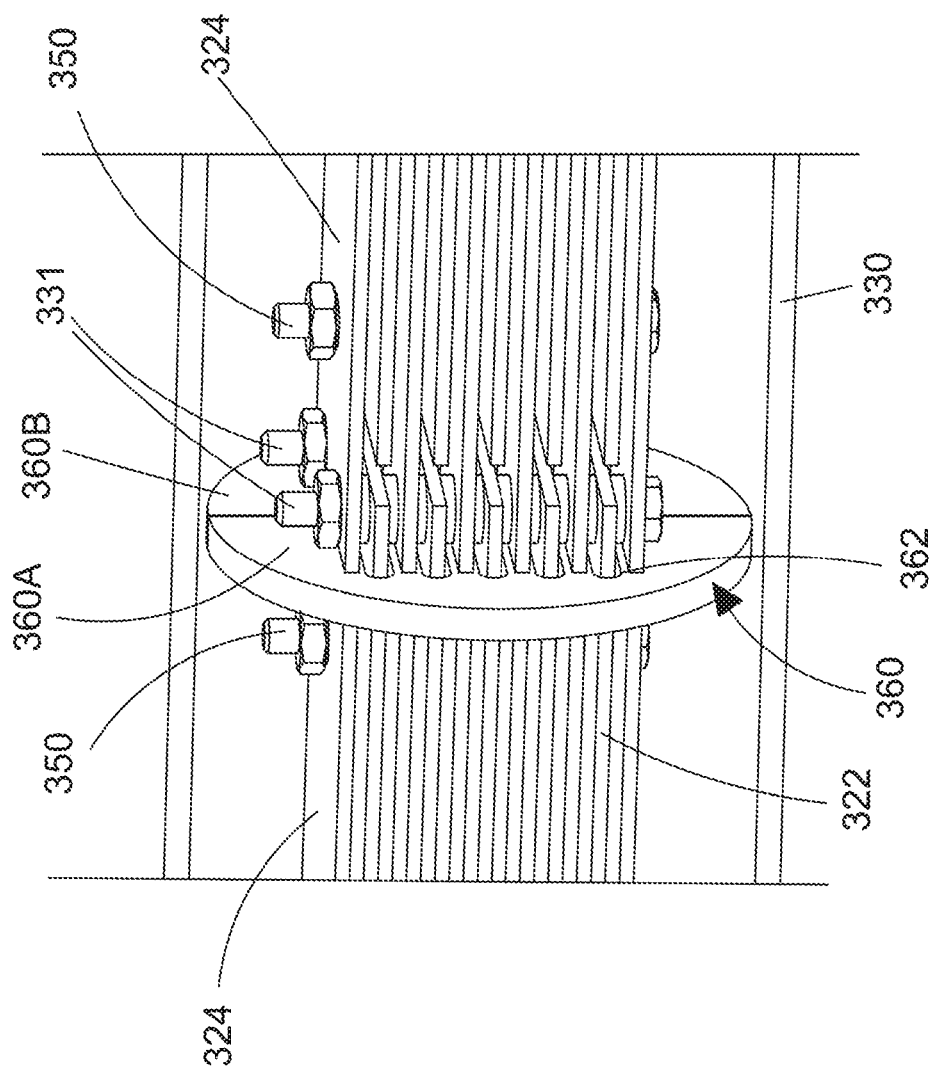
FIG. 5 illustrates a three-dimensional view of a section of the embodiment illustrated in FIG. 4.

FIGS. 4 and 5 illustrate another embodiment of the present invention. Electrolytic cell 300 has the same construction as illustrated in FIG. 3 comprising an anode assembly 304, a cathode assembly (not illustrated in this cross-section) and at least one bipolar electrode assembly 306 interposed between the anode and the cathode assemblies. Electrolytic cell 300 is placed in a reactor 310 which has two end plate assemblies 332. Only the end plate assembly 332 connected to the anode assembly is illustrated in FIG. 4. End plate assembly 332 comprises a conductive plate 319 and two cover plates 336, 338, one on each side of the conductive plate 319. In this embodiment the position of the bipolar electrodes and implicitly the position of the electrolytic cell 300 relative to the casing 330 of the reactor is maintained by a baffle 360 provided with openings 362 which allow the penetration of the bipolar electrodes 322 of the bipolar electrode assembly 306, as illustrated in FIGS. 4 and 5, and also allow the flow of the wastewater through the reactor from one side of the baffle to the opposite side, such that wastewater can flow over the surfaces of the electrodes of the electrolytic cell. Baffle 360 has a size that matches the interior dimensions of the reactor casing 330 with appropriate tolerances that allow its installation within the reactor and at the same time permit the desired positioning of the electrodes and respectively of the electrolytic cell within the reactor. Baffle 360 is made of a non-conductive material and therefore prevents a shunt current between the adjacent electrode assemblies. As illustrated in FIG. 5, baffle 360 has a circular shape to match the tubular shape of the reactor and of its casing 330 and it is made of two parts 360A and 360B which allows an easier installation of the electrodes 322 through its openings 362. The baffle 360, illustrated in FIGS. 4 and 5 is provided between the bipolar electrode assembly 306 and the neighbouring electrode assembly, more specifically in the space between the threaded bolt/nut assembly 331 and the free ends of the electrodes 324 of the neighbouring electrode assembly.

In preferred embodiments in order to maintain the position of the electrolytic cell 300 relative to the casing 330, more than one baffle is provided, preferably between each threaded bolt/nut assembly holding a bipolar electrode assembly and the ends of the electrodes of the neighbouring bipolar electrode assembly, or the ends of the anodes of the anode assembly and respectively the ends of the cathodes of the cathode assembly.

As seen in FIG. 5 the electrolytic cell can be provided with two threaded bolt/nut assemblies 331 for each bipolar electrode assembly which are similar in construction with the threaded bolt/nut assemblies 131 from FIG. 1 and serve the purpose of keeping the bipolar electrodes 322 and 324 together and with threaded bolt/nut assemblies 350 which are similar in construction and serve the same purpose as threaded bolt/nut assemblies 350 illustrated in FIG. 3, more specifically keeping the free ends of the electrodes at a certain distance from the neighbouring electrodes to avoid short-circuiting and to keep an even current density on the electrode surface. An even spacing between the adjacent electrodes across their entire surface allows an even current density on the surface of the electrodes.

In an another embodiment of the present invention, the distance between the neighbouring electrodes can be further kept constant along the entire length of the electrodes by using some spacing plates 370, 371 which are illustrated in more detail in FIG. 7 and are further described below.

Figure 6:
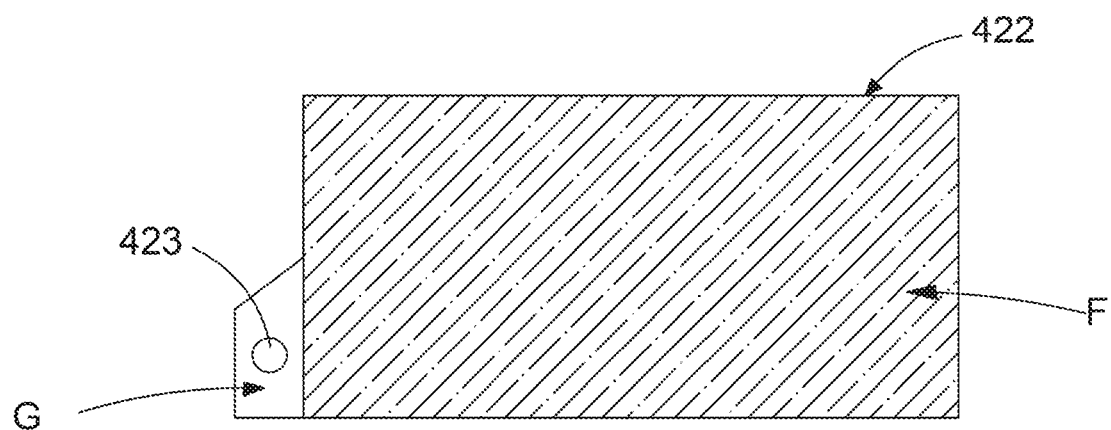
FIG. 6 illustrates a plate that can be used as an electrode in the embodiments illustrated in FIGS. 1 to 5.

The anodes, cathodes and bipolar electrodes of the present invention can have a rectangular shape as illustrated for example in FIG. 2, a circular shape or in other embodiments they can have a polygonal shape as illustrated for example in FIG. 6. Electrode 422 which can operate as a bipolar electrode, as an anode or as a cathode has a polygonal shape which forms two areas: rectangular area F which represents the active area of the electrode which is exposed to the wastewater to be treated and a polygonal extension represented by area G which is the assembly area of the electrode which, in the assembled cell, will overlap with the assembly area of the neighbouring electrodes of the electrode assembly to which it belongs. The assembly area G is provided with a hole 423 for allowing the penetration of the threaded bolt which keeps the electrode assembly together. In this embodiment, the assembly area of the electrode is reduced in comparison to the embodiments where the electrodes have an entirely rectangular shape. Since, in preferred embodiments, the entire plate forming the anode or the bipolar electrode which operates as an anode is coated with catalyst to prevent any catalyst delamination issues, the area of the catalyst layer not being used (assembly area G) is smaller than in the previous embodiments where the electrodes have an entirely rectangular shape, which helps reduce the cost of the electrolytic cell.

Figure 7:
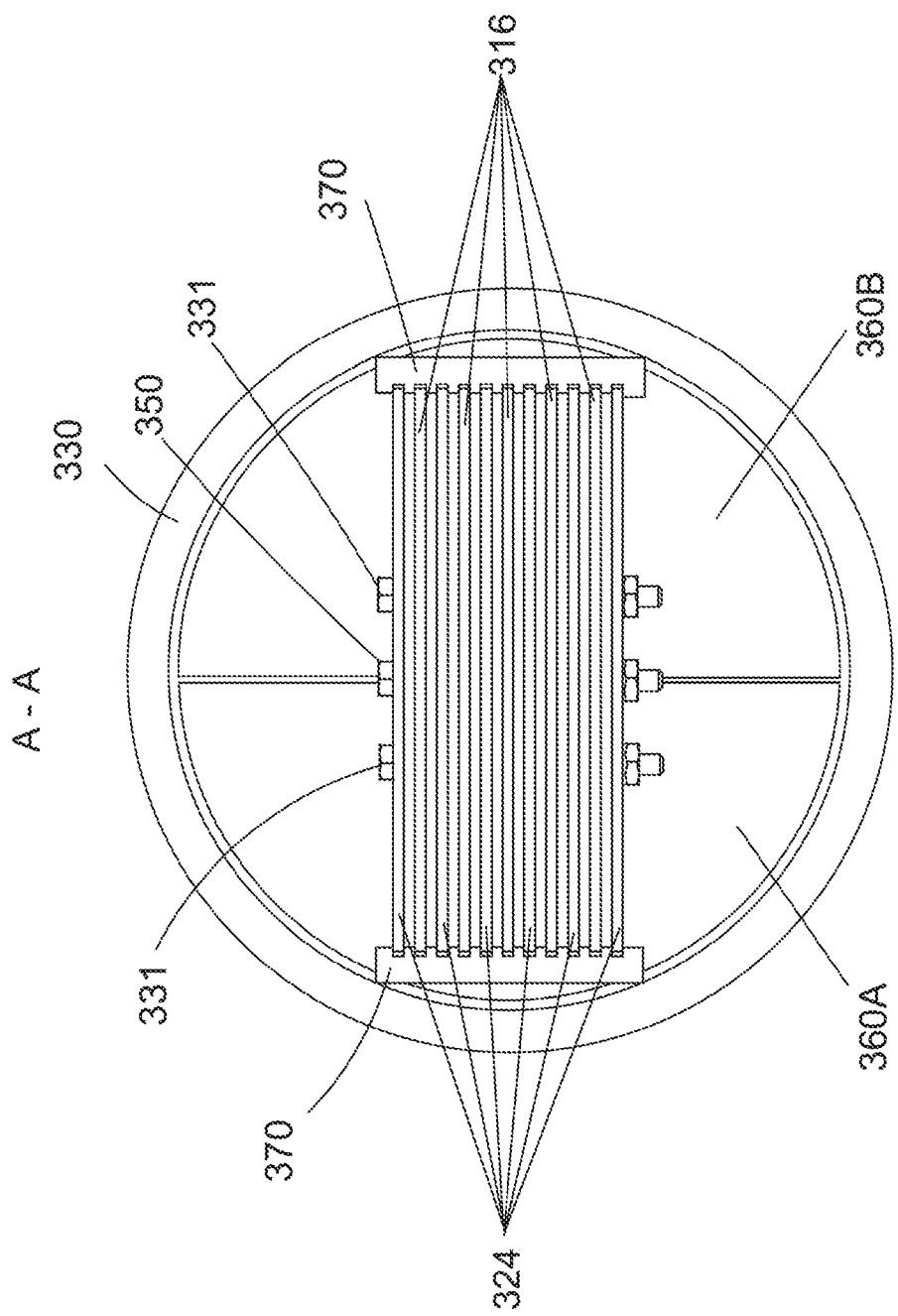
FIG. 7 illustrates, in a conceptualized form, the cross-sectional view A-A of the electrolytic cell illustrated in FIG. 4 showing in more detail the spacing plates positioned within the reactor on each side of an electrode assembly for maintaining the distance between the electrodes along their entire length.

FIG. 7 illustrates another embodiment of the present invention where one spacing plate 370 is positioned within the reactor 330 on each of the opposite sides of the anodes 316 of the anode assembly and bipolar electrodes operating as cathodes 324 of the neighbouring bipolar electrode assembly to keep them in a fixed relative position at predetermined distance along their entire length. In such embodiments, the distance between the electrodes can be minimized to enhance current flow between the electrodes and also the spacing plates help direct the flow of wastewater along the surface of the electrodes for a better electrochemical reaction. Such a reduced spacing between the electrodes has the advantages discussed above in regards to enhancing wastewater flow velocity, minimizing the electrical resistance between the electrodes and reducing the wastewater conductivity requirements. The spacing plates 370 are supported by the interior of the flow-through reactor and are constructed with tolerances that keep them in a fixed position relative to the electrodes and to the reactor. Such spacing plates can also be used to position the electrodes of the neighbouring bipolar assemblies (e.g. spacing plate 371 illustrated in FIG. 4) and the cathodes of the cathode assembly relative to the neighbouring bipolar electrodes (not illustrated).

A person skilled in the art would understand that, in alternative embodiments, an electrolytic cell according to the present invention can also be immersed in a tank which contains the wastewater to be treated, instead of being placed in a flow-through reactor.

A person skilled in the art would understand that the anodes, cathodes and bipolar electrodes of the electrolytic cell of the present invention can have a solid plate substrate, a mesh substrate or can be a porous plate or a plate with orifices.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

The disclosure of U.S. provisional patent application Ser. No. 62/646,168, filed Mar. 21, 2018, is incorporated herein in its entirety.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety.

I claim:

1. An electrolytic cell for wastewater treatment comprising:
   a. an anode assembly comprising a plurality of anodes stacked in a spaced face-to-face relationship along a threaded bolt made of an electrically conductive material with their ends overlapping over a predetermined portion and being separated by spacers made of an electrically conductive material which keep the anodes at a predetermined distance B from each other;
   b. a cathode assembly comprising a plurality of cathodes stacked in a spaced face-to-face relationship along a threaded bolt made of an electrically conductive material with their ends overlapping over a predetermined portion and being separated by spacers made of an electrically conductive material which keep the cathodes at a predetermined distance A from each other; and
   c. at least one bipolar electrode assembly comprising a series of bipolar electrodes operating as anodes and a series of bipolar electrodes operating as cathodes alternately stacked along a threaded bolt made of an electrically conductive material with their ends overlapping over a predetermined portion and being separated by spacers made of an electrically conductive material which keep the bipolar electrodes operating as anodes at a predetermined distance C from each other and which keep the bipolar electrodes operating as cathodes at a predetermined distance D from each other;
   wherein the bipolar electrodes of each bipolar electrode assembly which operate as anodes are oriented in an opposite direction from the bipolar electrodes which operate as cathodes such that the bipolar electrodes which operate as anodes are interleaved with the bipolar electrodes of a neighbouring bipolar electrode assembly which operate as cathodes or with the cathodes of the cathode assembly and the bipolar electrodes which operate as cathodes are interleaved with the anodes of the anode assembly or with the bipolar electrodes of a neighbouring bipolar electrode assembly which operate as anodes, and
   wherein the surface area of each of the conductive spacers placed between bipolar electrodes of the bipolar electrode assembly in contact with the bipolar electrodes is smaller in size than the surface area of each of the conductive spacers placed between the anodes of the anode assembly in contact with the anodes or than the surface area of each of the conductive spacers placed between the cathodes of the cathode assembly in contact with the cathodes.

2. The electrolytic cell of claim 1 wherein the anodes of the anode assembly, the cathodes of the cathode assembly or the bipolar electrodes are in the shape of a solid plate, a porous plate, a plate with orifices or a mesh.

3. The electrolytic cell of claim 1 wherein only the anodes of the anode assembly and the bipolar electrodes operating as anodes are coated with catalyst.

4. The electrolytic cell of claim 1 wherein the anodes of the anode assembly, the cathodes of the cathode assembly or the bipolar electrodes have a rectangular shape and are provided with at least one orifice for allowing the passage of the threaded bolt.

5. The electrolytic cell of claim 1 wherein the anodes of the anode assembly, the cathodes of the cathode assembly or the bipolar electrodes have a polygonal shape and comprise a rectangular active area and a polygonal extension of the rectangular active area which forms an assembly area which is provided with an orifice for allowing the passage of the threaded bolt.

6. The electrolytic cell of claim 1 wherein the entire surface of the anodes and of the bipolar electrodes operating as anodes is coated with catalyst.

7. The electrolytic cell of claim 1 wherein the anode electrode assembly is connected through the threaded bolt to a conductive plate which is connected to the positive side of a power supply and the cathode electrode assembly is connected through the threaded bolt to a conductive plate which is connected to the negative side of the power supply.

8. The electrolytic cell of claim 1 wherein the free ends of the anodes of the anode assembly, of the cathodes of the cathode assembly and of the bipolar electrodes of the bipolar electrode assembly are kept at a predetermined distance from the anodes, cathode or bipolar electrodes that they are interleaved with, by spacers of an electrically non-conductive material placed between electrodes, and by a threaded bolt and nut assembly made of an electrically non-conductive material, the threaded bolt protruding through holes provided in the spacers and in the free ends of the anodes, cathodes and bipolar electrodes.

9. The electrolytic cell of claim 1 wherein the anodes of the anode assembly or the bipolar electrodes of the bipolar electrode assembly which operate as anodes are interleaved with the cathodes of the cathode assembly or with the bipolar electrodes of the bipolar electrode assembly which operate as cathodes such that both sides of each anode or bipolar electrode operating as anode are facing a cathode or a bipolar electrode operating as a cathode.

10. The electrolytic cell of claim 1 wherein the number of cathodes of the cathode assembly and the number of bipolar electrodes operating as cathodes are each greater by one than the number of bipolar electrodes operating as anodes or the number of anodes.

11. The electrolytic cell of claim 1 wherein distances A, B, C and D are equal to each other.

12. A reactor enclosing the electrolytic cell of claim 1 comprising a tubular casing connected with an end plate assembly at each end, each end plate assembly comprising two cover plates and an electrically conductive plate interposed between the two cover plates, the electrically conductive plate of the first end plate assembly being connected to the anode assembly and to the positive side of a power supply and the electrically conductive plate of the second end plate assembly being connected to the cathode assembly and to the negative side of the power supply.

13. The reactor of claim 12 wherein the cover plates of each end plate assembly comprise an opening for feeding the wastewater to be treated to the electrolytic cell.

14. The reactor of claim 12 further comprising a baffle which is made of an electrically non-conductive material and which is placed within the tubular casing of the reactor in the proximity of the threaded bolt and nut assembly which secures the positioning of the bipolar electrodes of the bipolar electrode assembly, the baffle being sized to match the interior dimensions of the reactor casing with appropriate tolerances and being provided with openings through which the bipolar electrodes penetrate and which allow the flow of the wastewater which circulates through the reactor.

15. The reactor of claim 12 further comprising a spacing plate on each side of at least one of the anode assembly, the cathode assembly and at least one of the bipolar electrode assemblies, the spacing plates being placed between the respective assembly and an interior wall of the reactor, and being provided with channels in which the ends of the anodes, of the cathodes or respectively of the bipolar electrodes of the respective assembly are fitted to maintain a constant distance between them.

\* \* \* \* \*